(12) United States Patent
Vimalchand et al.

(10) Patent No.: US 8,961,629 B2
(45) Date of Patent: Feb. 24, 2015

(54) APPARATUS, COMPONENTS AND OPERATING METHODS FOR CIRCULATING FLUIDIZED BED TRANSPORT GASIFIERS AND REACTORS

(75) Inventors: Pannalal Vimalchand, Birmingham, AL (US); Guohai Liu, Birmingham, AL (US); Wan Wang Peng, Birmingham, AL (US)

(73) Assignee: Southern Company Services, Inc., Birmingham, AL (US)

(*) Notice: Subject to any disclaimer, the term of this patent is extended or adjusted under 35 U.S.C. 154(b) by 899 days.

(21) Appl. No.: 12/969,997

(22) Filed: Dec. 16, 2010

(65) Prior Publication Data

US 2011/0146152 A1 Jun. 23, 2011

Related U.S. Application Data

(60) Provisional application No. 61/288,533, filed on Dec. 21, 2009.

(51) Int. Cl.
  *C10J 3/08* (2006.01)
  *C10J 3/56* (2006.01)
  (Continued)

(52) U.S. Cl.
  CPC .. *C10J 3/56* (2013.01); *C10J 3/721* (2013.01); *C10J 3/84* (2013.01); *C10K 1/024* (2013.01); *F23C 10/002* (2013.01); *F23C 10/005* (2013.01); *F23C 10/10* (2013.01); *Y02E 20/18* (2013.01); *C10J 2300/093* (2013.01);
  (Continued)

(58) Field of Classification Search
  None
  See application file for complete search history.

(56) References Cited

U.S. PATENT DOCUMENTS 4,464,183 A * 8/1984 Arisaki ........................ 48/210
4,585,543 A * 4/1986 Duncan et al. ............... 208/407
(Continued)

FOREIGN PATENT DOCUMENTS

EP 0161970 11/1985
EP 0634470 1/1995
(Continued)

OTHER PUBLICATIONS

International Search Report as published for International Application No. PCT/US2010/061259, Dec. 21, 2009.
(Continued)

*Primary Examiner* — Imran Akram
(74) *Attorney, Agent, or Firm* — Thomas | Horstemeyer, LLP

(57) ABSTRACT

The improvements proposed in this invention provide a reliable apparatus and method to gasify low rank coals in a class of pressurized circulating fluidized bed reactors termed "transport gasifier." The embodiments overcome a number of operability and reliability problems with existing gasifiers. The systems and methods address issues related to distribution of gasification agent without the use of internals, management of heat release to avoid any agglomeration and clinker formation, specific design of bends to withstand the highly erosive environment due to high solid particles circulation rates, design of a standpipe cyclone to withstand high temperature gasification environment, compact design of seal-leg that can handle high mass solids flux, design of nozzles that eliminate plugging, uniform aeration of large diameter Standpipe, oxidant injection at the cyclone exits to effectively modulate gasifier exit temperature and reduction in overall height of the gasifier with a modified non-mechanical valve.

14 Claims, 10 Drawing Sheets

(51) Int. Cl.
*C10J 3/72* (2006.01)
*C10J 3/84* (2006.01)
*C10K 1/02* (2006.01)
*F23C 10/00* (2006.01)
*F23C 10/10* (2006.01)

(52) U.S. Cl.
CPC .... *C10J2300/094* (2013.01); *C10J 2300/1807* (2013.01); *C10J 2200/152* (2013.01)
USPC ........................................................ 48/62 R

(56) References Cited

U.S. PATENT DOCUMENTS

| | | | | |
|---|---|---|---|---|
| 2008/0161428 A1* | 7/2008 | Strait | ........................... | 518/702 |
| 2008/0216655 A1 | 9/2008 | Vimalchand | | |
| 2009/0188165 A1* | 7/2009 | Ariyapadi et al. | ............... | 48/210 |
| 2009/0294328 A1* | 12/2009 | Iqbal | ................ | 208/67 |
| 2010/0011664 A1* | 1/2010 | Ariyapadi et al. | ............... | 48/128 |
| 2010/0101146 A1* | 4/2010 | Fujimori et al. | ................ | 48/210 |

FOREIGN PATENT DOCUMENTS

| | | |
|---|---|---|
| EP | 0634471 | 1/1995 |
| FR | 2586941 | 3/1987 |
| JP | 2009227704 | 10/2009 |
| KR | 100460217 | 12/2004 |
| WO | 2008107928 | 9/2008 |

OTHER PUBLICATIONS

Extended European search report dated May 6, 2013.

* cited by examiner

TOP VIEW

APPARATUS, COMPONENTS AND OPERATING METHODS FOR CIRCULATING FLUIDIZED BED TRANSPORT GASIFIERS AND REACTORS

CROSS REFERENCE TO RELATED APPLICATION

This application claims the benefit of U.S. Provisional Application No. 61/288,533, filed Dec. 21, 2009, which is hereby incorporated herein by reference.

STATEMENT REGARDING FEDERALLY SPONSORED RESEARCH OR DEVELOPMENT

This invention was made with Government support under Cooperative Agreement Number DE-FC21-90MC25140 awarded by the United States Department of Energy. The United States government has certain rights in the invention.

FIELD OF INVENTION

This invention relates to pressurized circulating fluidized bed transport reactors in general and, more specifically, various components in a transport gasifier loop.

BACKGROUND

Among various gasification technologies reviewed in a book by Higman and van de Burgt (*Gasification*, 2003, Elsevier), it becomes clear that new technologies are desired to improve the economics of gasifying low rank coals, particularly coals with high moisture and/or high ash content such as lignite or subbituminous coals.

The entrained flow gasifiers feed coals with particle sizes less than 75 microns either with a dry or slurry feed system. For dry feed methods, the coal moisture has to be less than 5% to prevent coal particles from forming cakes and bridging in the feed system, particularly in the feed system's lock vessel. For the slurry feed system, about 35 wt % water have to be added to make the coal slurry. It is necessary to dry the coal to very low moisture levels before making slurry to avoid more than 40% total water in the slurry. In general, low rank coals contain more than 30% moisture; to dry the coals to less than 5% moisture requires an expensive drying facility with large operating costs, decreasing the overall process efficiency. It is highly desirable to reduce drying duties and operational concerns in processing low rank coals.

U.S. Pat. No. 6,631,698 discloses a circulating fluidized bed reactor which can be used for gasifying low rank coals. However, the apparatus can only be used in an atmospheric application and requires a large foot-print to produce the large amount of synfuel required by a modern chemical or power plant where coal gasifiers are installed.

U.S. Pat. No. 5,560,900 discloses a process based on a pressurized circulating fluidized bed reactor which is also intended to partially oxidize the low rank coals. The concept proposed to process coal is based on more than five decades of experience with low pressure Fluid Catalytic Cracking (FCC) process in the petroleum industry. As a result, the reactor system, as has been disclosed, uses the Riser as a pyrolyzer with the large amount of heat necessary for the pyrolysis reaction is carried by finely divided refractory materials circulating around the reactor loop. How to separate the coal ash generated in the process from the heat carrying materials is one of the issues that are very difficult to deal with and the patent avoids the issue. Further, this reactor has a Mixing zone below the Pyrolysis zone whose diameter is much larger than the Riser diameter to ensure sufficient residence time to heat-up the coal particles fed into the Mixing zone. The minimum gas velocities necessary to entrain circulating solid particles from the Mixing zone causes the gas velocities to be unusually high in the Transport riser, leading to rapid erosion of any internals such as thermowells and erosion of the cyclone wall. Further, as the pyrolysis reaction needs a much longer residence time for completion and prevent tar formation in the product synthesis gas (syngas), the Riser has to be impractically tall in a commercial process for the reactor proposed in the patent. Also, this process does not teach how to distribute the gas (steam and air or oxygen) appropriately across the cross-section of a commercial size gasifier.

Moving bed gasifiers have been used to gasify low rank coals for more than 100 years. The Lurgi gasifier, in particular, has been widely used to produce syngas for chemical synthesis. However, the moving bed gasifier requires lump coal as feed and cannot utilize the coal fines which are in abundance that often has few users nearby. Another drawback of this technology is that much of the coal is converted into tar rather than useful syngas.

Moreover, all these gasifiers have complicated internals. The moving bed gasifiers have an elaborate rotating grid system and a stirring mechanism as internals for caking coals. The fluidized bed gasifiers have various types of complicated internal gasification agent distributors which are made of exotic alloys to tolerate the gasifier operating temperatures up to 1100° C. In spite of considerable efforts in designing the distribution grids and selecting expensive high temperature alloy materials, failures of these grids still occur which is commercially unacceptable. In the case of entrained flow gasifiers, the most problematic internal is the coal burner which is one of the most maintenance intensive items in the process.

This invention provides an improved apparatus for a wide range of circulating fluid bed applications including gasification of low rank coals such as lignite and subbituminous coals.

SUMMARY OF THE INVENTION

This invention provides a reliable apparatus and a method to gasify low rank coals in a class of pressurized circulating fluidized bed reactors termed as a transport gasifer. Embodiments of the invention overcome the problems mentioned above with prior art gasifiers. The transport gasifier loop includes a gasification agent distribution system, a mixing zone, a riser, a first stage cyclone called presalter cyclone, a secondary cyclone called standpipe cyclone, a seal-leg to return the solids collected in the presalter cyclone to a standpipe, and a non-mechanical valve to move the solids from standpipe to mixing zone and at the same time substantially reduce or prevent reverse flow of gases.

The gasification agent feed systems according to embodiments of the disclosure can be implemented with few or no internals. The distribution system can substantially reduce or prevent hot solids back flow. The uniform distribution of the gasification agent across the cross-section of the gasifier is facilitated by the solids particle movement inside the gasifier.

Embodiments of the transport gasifier can also include nozzles that feed the gas into the gasifier with mechanisms to substantially reduce or prevent the nozzles from being plugged when the gasifier is suddenly shutdown for process or safety reasons. The solids settled in the nozzles during shutdown can simply be blown back into the gasifier upon restart of gas flow to the nozzles. Accordingly, the transport gasifier nozzles can avoid being plugged.

A transport gasifier according to embodiments of the disclosure can also employ a first stage presalter cyclone that can separate high loading of solids in the carrying gas as well as substantially reduce or prevent the cyclone wall from being eroded by such high solids loadings. Also, in contrast to prior art cyclones, the presalter cyclone according to embodiments of the disclosure in the first stage can be employed with no vortex finder as well as with no roof. These concepts can reduce reliability problems encountered in a commercial high pressure, high temperature first stage cyclone design, operation and long-term performance.

The solids collected by the presalter cyclone can flow to the standpipe through a seal-leg. The position and design of the seal-leg in various embodiments of the transport gasifier take advantage of natural pressure gradients in order to minimize gas addition to the seal-leg and gasifier loop.

A standpipe cyclone can collect particles from the gas stream and the fine solids collected by the standpipe cyclone can subsequently merge with solids collected by the presalter cyclone and return to the riser through the standpipe. Embodiments of a transport gasifier can reduce or avoid flowability problems related to fine solids as the fine solids flow down the standpipe. Also, this invention facilitates mixing of finer solids with coarser solids collected by the presalter cyclone as the coarser solids flow to the standpipe through the seal-leg.

In various embodiments of the disclosure, some of the gasification agent, oxygen and/or air along with steam, can be injected at the exit of the first stage or the second stage cyclone in order to increase the gas outlet temperatures and reduce the carbon content in the fly ash. The gasification agent injection can also reduce the methane content and increase the carbon monoxide and hydrogen content in the product gas.

A transport gasifier according to embodiments of the disclosure also allows for a more optimal configuration of the locations of aeration nozzles in the standpipe relative to the prior art. An aeration gas can be employed in or near the bottom of large diameter standpipes for large scale commercial applications, so that the aeration gas can be distributed and facilitate the solids flow from the standpipe to the riser through a non-mechanical valve.

In one embodiment, the bulk density in the riser can be in the range of about 5-20 lb/ft3. In one embodiment, the mass ratio of the circulating solids to the feedstock can be between about 50 to 200. The wide range is beneficial to optimize design and operations for feedstocks with different coal characteristics.

The transport gasifier provides methods for controlling the solids level in the standpipe and operating the gasifier with high desired solids fluxes and riser densities as well as at sustained high solids circulation rates in the loop, resulting in significant improvement to conversion of coal to syngas with maximum syngas production rates.

DETAILED DESCRIPTION OF THE EMBODIMENTS

Figure 1:
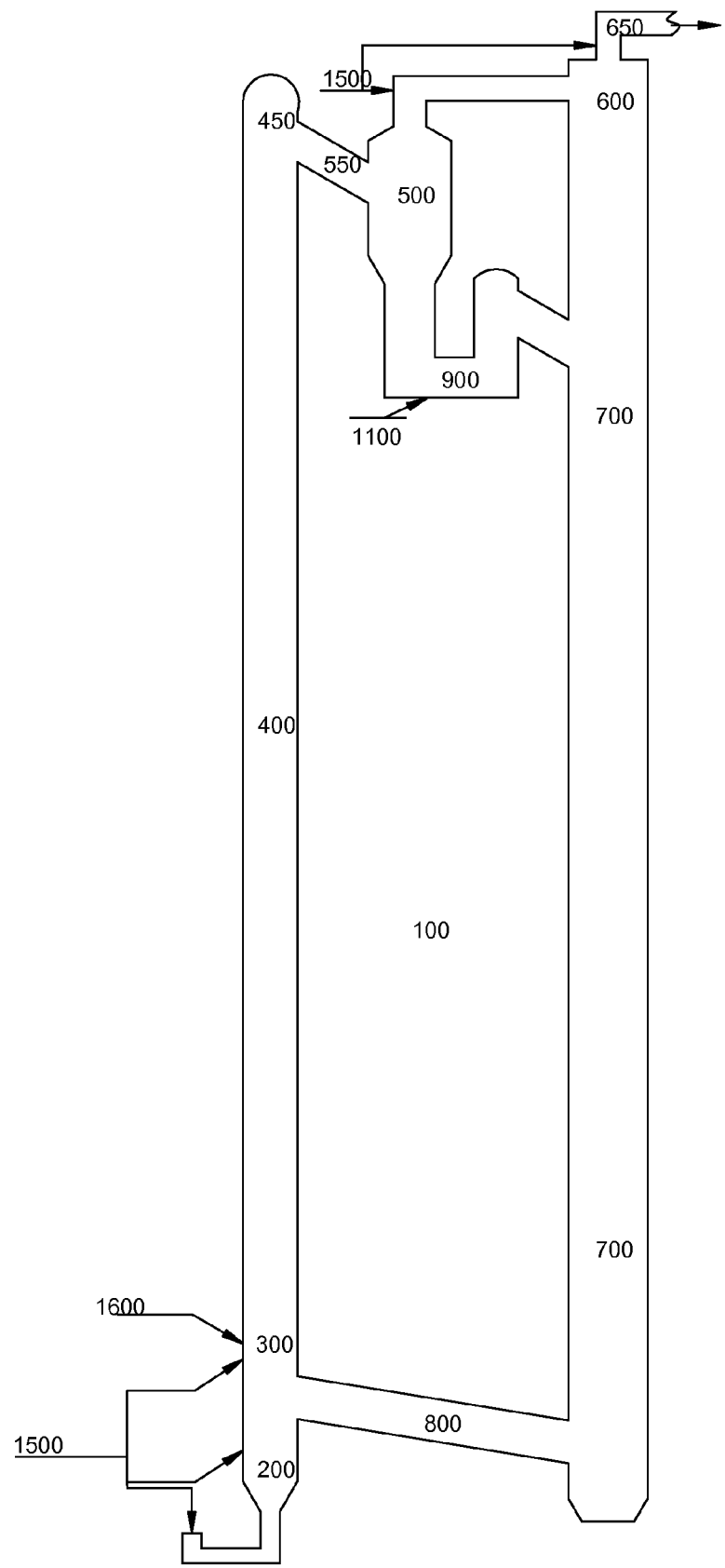
FIG. 1 is an illustration of the transport gasifier loop.

Various embodiments and illustrations of a transport gasifier loop according to embodiments of the disclosure are described by examples and illustrations. FIG. 1 illustrates the transport gasifier loop 100. The gasifier vessel wall can be made of carbon steel and the shell can also constitute the pressure boundary of the gasifier. The gasifier loop 100 can be operated at pressures between about 100-1000 psia depending on the process requirement of units utilizing resultant syngas downstream. Inside the shell of the gasifier loop 100, there can be two layers of refractory lining. An inner layer, in contact with the circulating bed of solids, can include a layer of erosion resistant refractory to protect the soft insulation refractory and vessel wall. The outer insulating layer can be in contact with the shell of the gasifier loop 100 on one side and erosion resistant refractory on the other side. The insulation refractory protects the shell from overheating. One embodiment of the transport gasifier loop 100 can include a gas distributor near the bottom of the gasifier, a lower mixing zone, an upper mixing zone, a riser, an inclined crossover, a first stage (presalter) cyclone, a second stage standpipe cyclone, a standpipe, a seal-leg connecting the presalter cyclone and the standpipe, and a non-mechanical valve that connects the standpipe and the mixing zone, which will be described in further detail herein.

Figure 2:
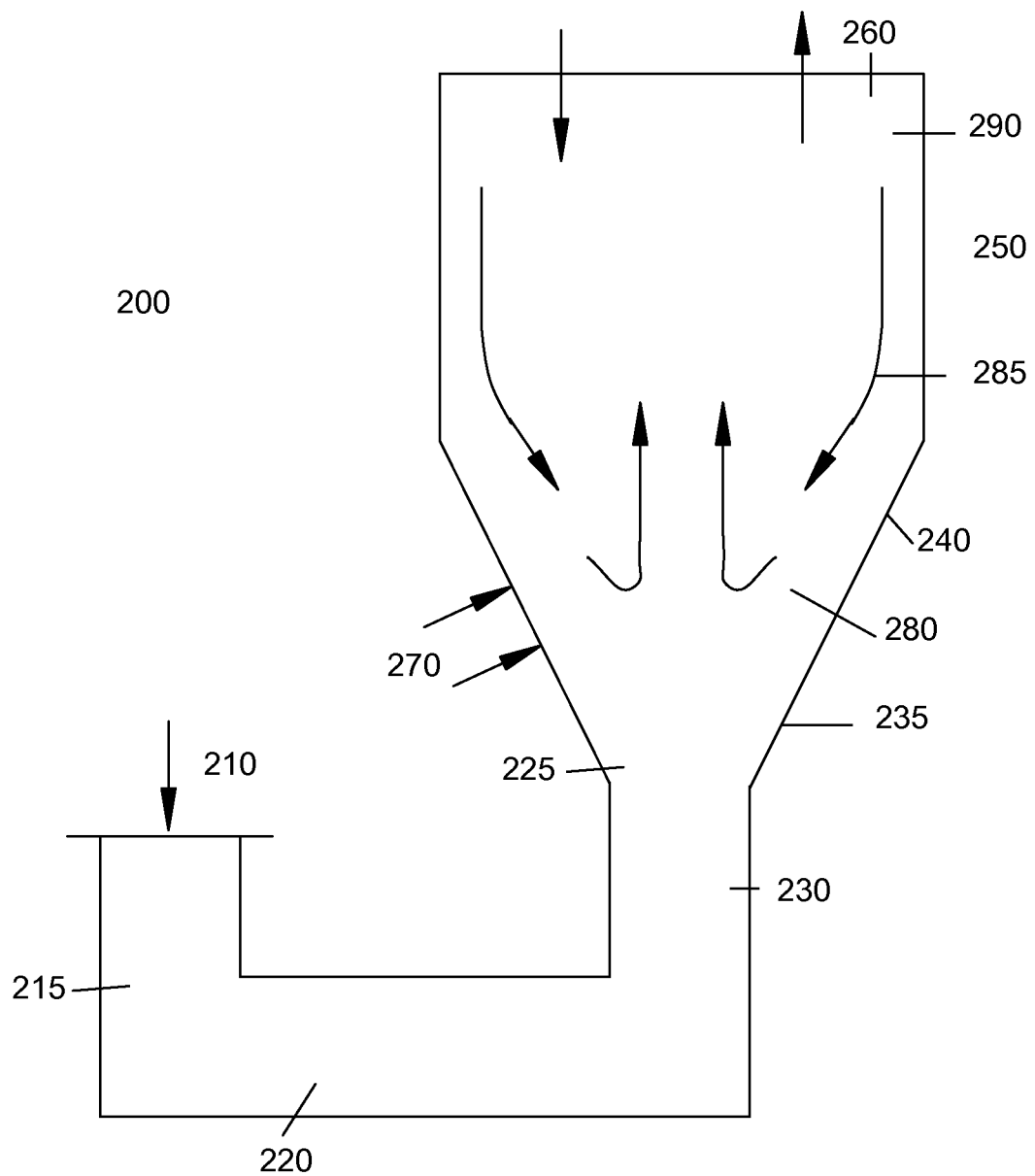
FIG. 2 is a sketch of the gas distributor as part of the lower mixing zone through which a portion of the gasification agent is introduced into the gasifier.

FIG. 2 is an illustration of the lower mixing zone (LMZ) 200 of a transport gasifier loop 100 according to an embodiment of the disclosure, through which about 25-100% of the gas (e.g., air, oxygen and/or steam) used for the gasification reactions is injected. The characteristics of the feedstock dictate the amount of gas that needs to be injected in the LMZ, and the remainder can be distributed along the height of the mixing zone (e.g., both lower and upper mixing zones). In the embodiment shown in FIG. 2, the LMZ 200 consists of a jetting gas distributor or the gas inlet section 225. About 70-95% of the gas entering the LMZ can be injected through the nozzle inlet 210 in the distributor section. The remaining 5 to 30% of gas injected into the LMZ can be fed through a plurality of nozzles 270 located along the cone section 240 of the distributor at various elevations. The number of nozzles, orientations and elevations can vary depending upon the type of feedstock and gasifier size as can be appreciated. Together, the gas flowing through the gas inlet section 225 and nozzles 270 provide a way to introduce and distribute the gasification agent across the entire cross-section of the gasifier without any internals.

The nozzle inlet 210 demarcates the gas distributor's refractory lined pipe with metal pipe that conveys gas from its source. The U-shaped refractory lined pipe in the embodiment shown in FIG. 2 has a vertical section 215 through which the gas flows downward and is connected to the horizontal section 220 and another vertical section 230 through which the gas flows upward towards the throat before entering the cone section of the distributor. All these sections can be made of a refractory lined pipe. When for a safety or process reason, the gasifier trips, the solids held-up in the gasifier mixing zone and/or riser sections will fall and settle in lower portion of the gasifier, filling the vertical section 230 and a portion of the horizontal section 220. The design of the horizontal section 220 is such that the solids will not reach the vertical section 215. This design safely protects the connecting metal pipe at inlet 210 from hot settling solids whose temperature can range up to 2000° F. Also the length to diameter ratio of at least four for the horizontal section 220 can be employed so that that the solids settled can be blown back into the gasifier upon resumption of gasification operations. Operability and safety concerns are greatly reduced as plugging of main gasification agent feed line is reduced and/or eliminated.

The gasification agent flowing through the inlet section 225 enters the cone section 240 of the LMZ 200. The superficial gas velocity at the throat in the inlet 225 can be between about 50-300 ft/s. The wide range of velocities with which the gasification agent can be introduced into the gasifier increases the flexibility of operations by providing a method to introduce and distribute the gasification agent from start-up to full load. The gasification agent can mix with the solids refluxing and falling into the bottom of the LMZ 200. The char carbon in the refluxing solids is combusted by the oxidant in the gasification agent. In operating the apparatus, the indication for whether the solids are refluxing and mixing well, especially all the way to the very bottom of the cone section, can be inferred from a set of temperature indications 280. If a sufficient amount of solids has refluxed into the lower bottom section of the LMZ, the temperature indication 280 will be nearly the same as other temperature indications inside the gasifier. If the hot solids refluxing into the bottom of LMZ is less than desired, the solids level in the standpipe can be increased by reducing the rate of ash discharge or by adding more inert solids to the gasifier. This increases the rate of recycled solids flow from standpipe into the mixing zone, increasing the density of solids in the LMZ 200 which increases the rate of hot solids refluxing throughout the LMZ 200.

The gasification agent flows into the cylindrical section 250 of the LMZ 200 and the remaining oxygen in the gasification agent will be consumed by the char carbon in the circulating solids. In a properly operated gasifier, the set of temperature indications 285 and 290 will be nearly the same as the set of temperature indications 280. The gas streams entering the LMZ 200 and the gas generated due to combustion and gasification reactions flows out of the LMZ at outlet 260. The superficial gas velocity leaving LMZ at outlet 260 can be in the range of about 5 to 15 ft/s which is sufficient to entrain significant amount of solids out of LMZ by the gas. This allows fresh recycled solids flowing from the standpipe to reflux throughout the LMZ. As char is continuously introduced into the LMZ with fresh solids refluxing down, the temperature profile in the LMZ is maintained through combustion and gasification reactions. The bed density in the LMZ can be between 15-40 pounds per cubic feet. Such a bed density in the LMZ can be attained by adjusting the solids level and aeration rate in the standpipe (affecting the solids rate from the standpipe to mixing zone) as well as by adjusting the distribution of the gas between the LMZ and upper mixing zone 300 (affecting the superficial gas velocity in the LMZ).

Figure 3:
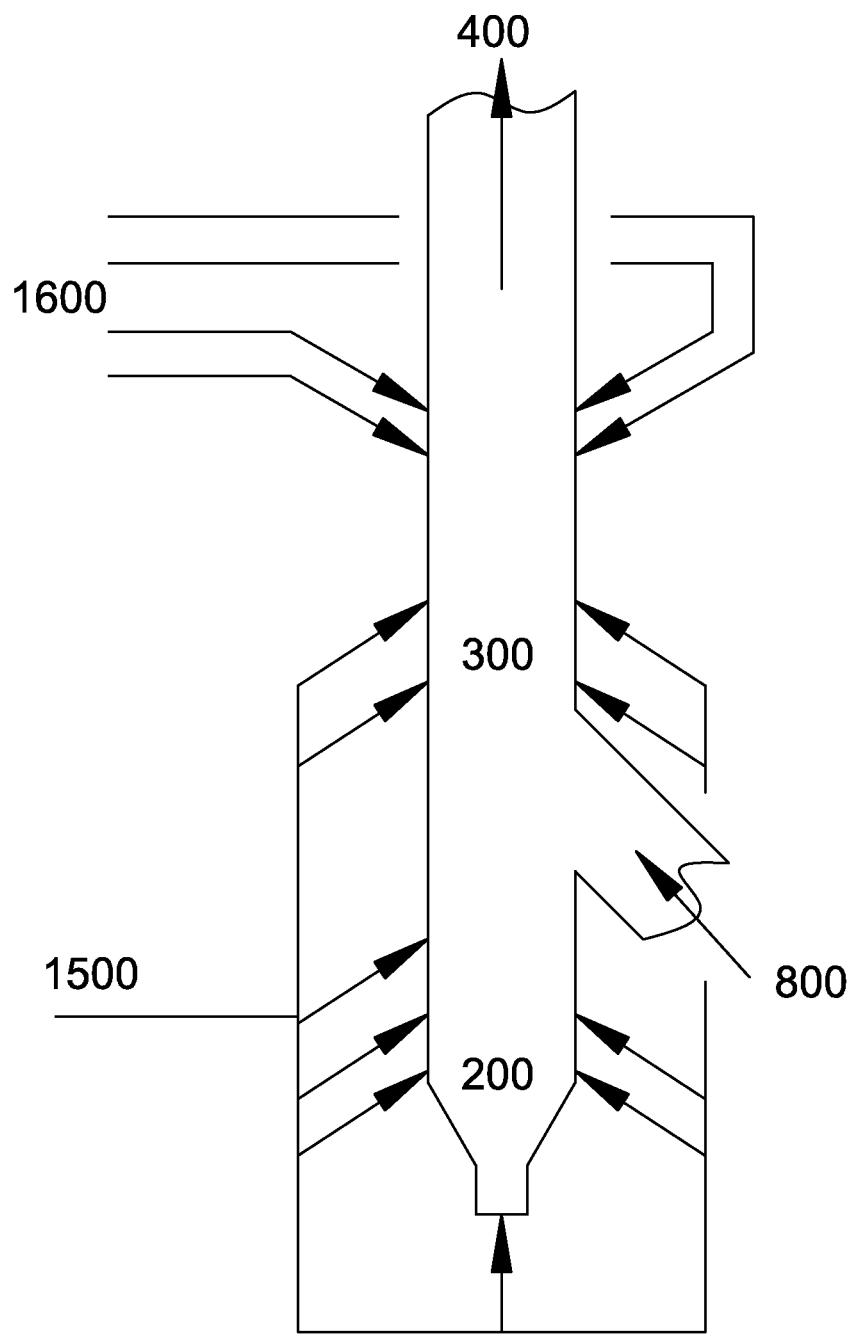
FIG. 3 is an illustration of the lower mixing zone, the upper mixing zone, the lower portion of the riser and non-mechanical valve entrance to the gasifier mixing zone along with coal injection nozzles and feed gas distribution to manage heat release and attain uniform and rapid heat-up of coal particles.

The gas injected into the LMZ flows upward to the upper mixing zone (UMZ) 300 as shown in FIG. 3. The unreacted oxygen in the feed gas from the LMZ can first encounter the char carbon in upper portion of the LMZ and lower portion of UMZ. The char carbon can be refractory (e.g., non-reactive from gasification perspective) in nature and is present in the circulating solids recycled from the standpipe 700 (FIG. 1) through the non-mechanical valve 800. In the embodiment presented in FIG. 3, the char carbon can be utilized to generate heat energy that can be necessary for highly endothermic gasification reactions that occur in riser 400. The gasifier temperature profile is maintained as the combustion heat generated is consumed through the gasification reactions endothermicity, heat losses and sensible heat in the syngas exiting the gasifier. Due to potentially significantly high solids circulation rates (with high mass fluxes), the char carbon content in the circulating solids can be in the range of about 0.1% to 4% which is more than sufficient to consume all the oxygen in the feed gas. Since the recycled solids from the Standpipe flowing into the mixing zone can be in the range of about 1600-2000° F., the rate of char combustion reaction is nearly instantaneous. The oxygen from the lower mixing zone can be consumed rapidly upon encountering the char carbon.

For some applications, additional oxidant may be necessary to consume any excess char carbon in the circulating solids. This is accomplished by adding the oxidant 1500 directly to the UMZ 300 as shown in the embodiment in FIG. 3. The percentage of char carbon content in the circulating solids is controlled by the solids circulation rate, coal feed rate, the overall gasifier temperature and the temperature distribution along the height of the gasifier. Distribution of oxidant in the feed gas is helpful in controlling the heat release along the lower portion of the gasifier loop. High solids circulation rates and uniform and distributed heat release prevent hot spots. Hot spots can be highly detrimental to gasifier operation as they would lead to agglomeration, slagging and clinker formation.

High solid fluxes and equally high solid circulation rates facilitate uniformly high operating temperatures around the gasifier loop 100, leading to high hot gas efficiencies with desirable gaseous products. The hot solids circulating around the gasifier loop can be thought of as a thermal flywheel in which energy is added through char combustion and consumed through gasification reactions, heat losses and sensible heat. In one complete cycle around the gasifier loop, about 5% of thermal energy is added to the thermal flywheel in the mixing zone which is eventually consumed in the Riser and other parts of the gasifier. As the energy added and consumed is only a small percent of thermal energy circulating around the gasifier loop, the gasifier temperature around the loop is nearly uniform.

Coal or other carbonaceous solids from feeders 1600 can be added to the upper section of UMZ 300 as shown in the transport gasifier's feed section embodiment in FIG. 3. Depending on reactivity of feed solids, the mass mean diameter (MMD) of feed solids can be in the range 200 to 500 microns. The MMDs of low rank coals, which tend to be highly reactive, can be in the 350 to 500 micron range. Such large feed size reduces grinding costs and also generates ash in the size range that is suitable for maintaining high solids (ash) circulation rates in the transport gasifier loop.

Since all the oxygen fed into the gasifier can be consumed in LMZ and lower sections of the UMZ by the char carbon in the circulating solids, the coal fed into the gasifier may not come in contact with any oxygen in the feed gas. For most chemical applications, the coal is conveyed to the gasifier by $CO_2$ or nitrogen. Without fresh coal coming in-contact with oxygen, local hot spots can be avoided and the probability of clinker formation can be eliminated. For air-blown operation of the gasifier for integrated gasification combined cycle (IGCC) applications, it can be advantageous to convey the coal with air. The amount of air used for such conveying is less than about 15% of the total air injected into the gasifier in such an application. High solids circulation rates in the gasifier loop and injection of coal at different elevations in the upper portion of UMZ 300 can disperse the oxygen in the conveying air quickly and the possibility of forming any hot spots in the gasifier is minimized.

Due to high solids circulation rates in embodiments of a transport gasifier, the coal particles are heated at a high rate (e.g., at a rate of about 50,000° F./second) in the lower portion of the Riser 400 of the gasifier. Such high heat-up rates lead to evolution of large fraction of feed as volatiles and many of the thermal cracking of volatiles and gasification reactions occur in the Riser. The carbon conversion in the riser to useful gaseous products can be in the range 65-80% in the first pass through the Riser. The unreacted char carbon can be collected by the cyclone systems and returned to the mixing zone to react with oxidant fed into the lower portions of the mixing zone. The heat released with partial or complete oxidation in the mixing zone maintains the gasifier at a desired temperature. The density of inert solids that circulates around the gasifier loop can be in the range of 15 to 20 lbs/cu ft in the Riser. Such high density of solids in a riser in an embodiment of the disclosure, whose mass mean diameter can be in the range 75 to 100 microns, provides a large amount of surface area and is effective in cracking small organic molecules and other devolatalized products from coal to desired syngas components of CO and hydrogen.

For highly reactive fuels such as low rank coals, the configuration of transport gasifier can have the same or similar internal diameter for LMZ, UMZ and riser. For less reactive fuels, the LMZ internal diameter is larger than upper portion of the gasifier. As the LMZ will handle more char carbon from less reactive fuels, the LMZ's functionality changes to optimizing partial oxidation and steam gasification reactions.

Figure 4:
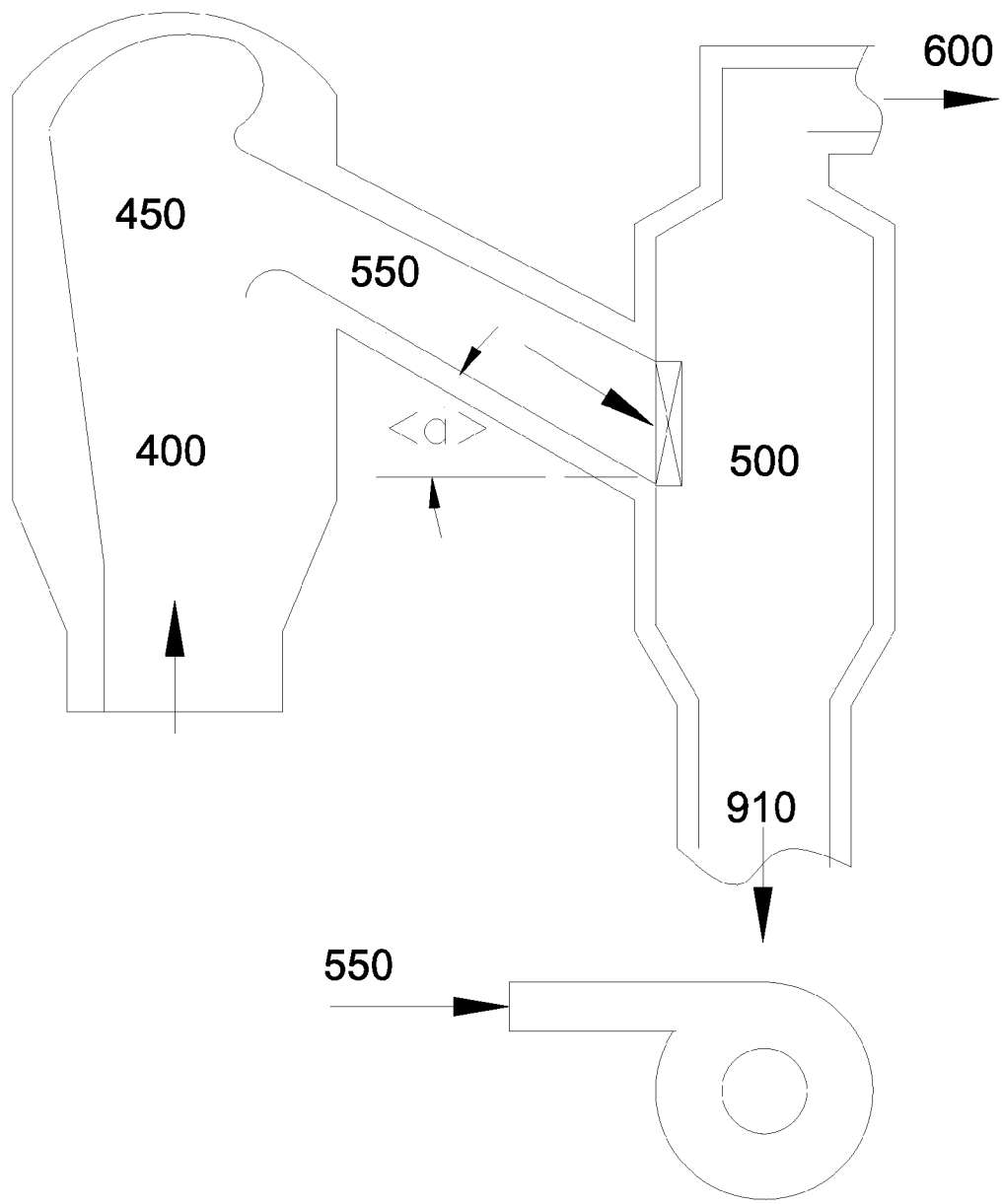
FIG. 4 is an illustration of the riser bend connecting the riser and inclined crossover through which the salted out solids in the gas stream tangentially enter the presalter cyclone.

The unreacted char carbon and circulating inert solids travel along the riser 400 to the top and exit the riser 400 through a specially designed bend 450 that connects the riser 400 with the inclined crossover 550. An example of the bend is illustrated in FIG. 4. The structure and design of the bend 450 minimizes the pressure drop and avoids erosion of the inclined crossover 550 and the bend 450. The solid particles that constitute the high mass circulating solids in the transport gasifier can be continuously derived from ash generated in the gasifier from feed coal. They can be of irregular shape and abrasive. If the bends are not carefully designed, even erosion resistant refractory will last for only a small fraction of its intended lifetime. The solids and gas stream enter the bend 450 at 15 to 35 ft/s velocity. With a long radius bend 450 that is technically feasible based on other constraints, the circulating solids stream impinges and tend to erode the upper portion of the bend. With a tee- or cross-type bend, both upper and lower portions of the bend tend to erode. In the embodiment of FIG. 4 used in one embodiment of a transport gasifier, a small part of the circulating stream enters the extended portion of the bend. This stream cycles around in the extended portion of the bend and enters the inclined crossover 550, pushing the main circulating stream that enters the inclined crossover 550 away from upper portions of the crossover 550. These actions lead to the main circulating stream directed towards lower portion of the crossover 550 and the point of contact is termed as first touch-down. Such contacts (e.g., second touch-down, etc.) may occur in an improperly designed system. In one embodiment, the extended portion of the bend 450 along with the inclined crossover 550 is designed to reduce or eliminate the erosion of upper portion of the crossover 550 refractory as well as the effects of touch-downs.

The solids and gas mixture exiting the riser 400 through the bend 450 enters a first stage cyclone, the presalter cyclone 500. As illustrated in FIG. 4, the crossover 550 connecting the riser bend 450 and the presalter cyclone 550 is inclined downward. The angle of inclination <a> can be in the range of about 15 to 60 degrees depending on the characteristics of solids circulating in the gasifier loop. The inclination will cause the solids to separate from the gas in the crossover 550, and bulk of the salting-out solids will flow along the bottom of the crossover and directly into the barrel of the presalter cyclone 500 without much spinning along the wall; this action of solids along with other concepts described in U.S. Pat. No. 7,771,585, which is hereby incorporated herein by reference in its entirety, can decrease the possibility of erosion of the cyclone wall. The presalter cyclone is conceptualized for high solids circulation rates and mass fluxes which are critical for circulating pressurized fluidized bed gasifier performance. The presalter cyclone in FIG. 4 can be implemented with no vortex finder as well as with no roof. These concepts reduce or eliminate numerous reliability problems encountered in a commercial high pressure, high temperature cyclone design, operation and long-term performance.

Figure 5:
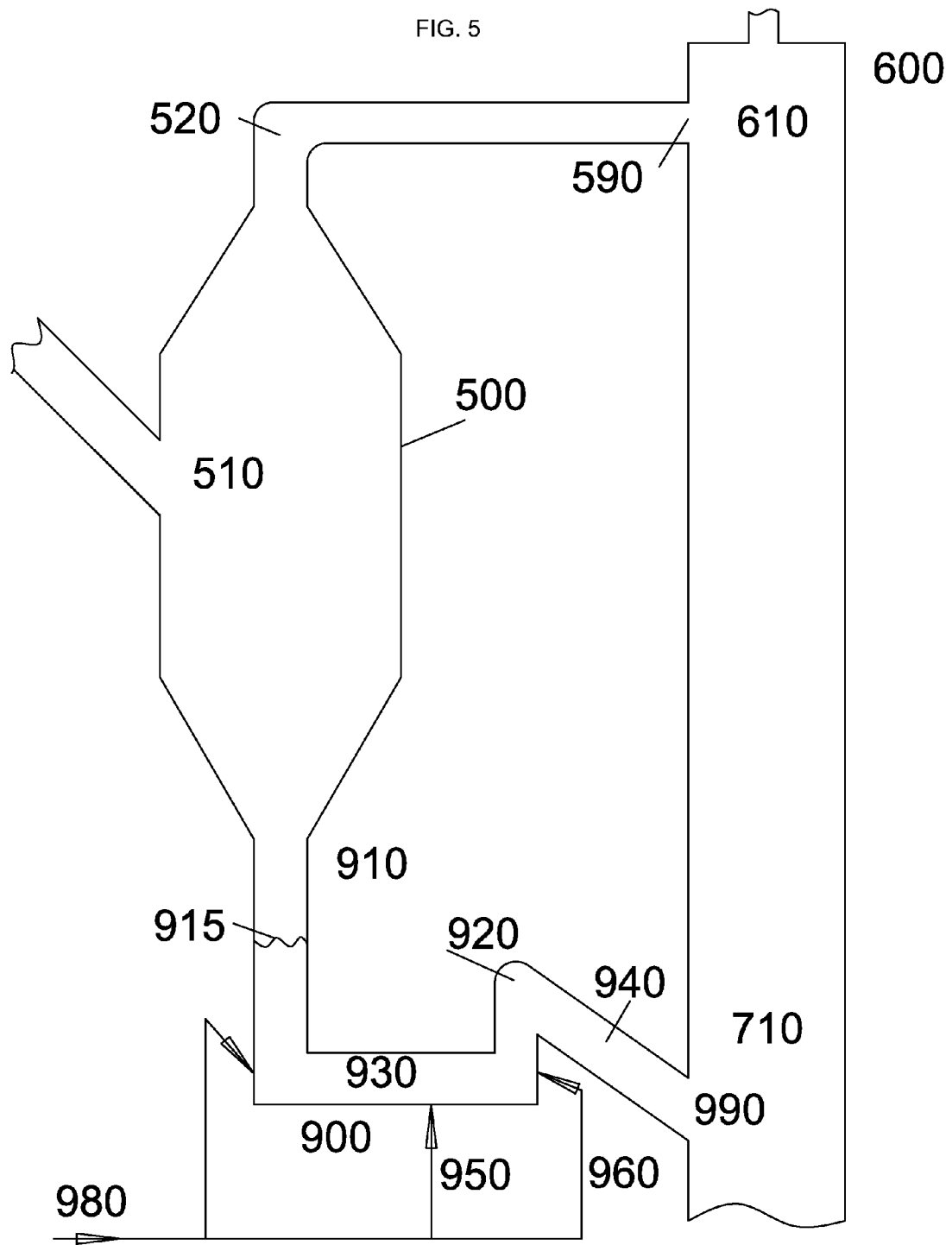
FIG. 5 is a sketch of the Seal-leg connecting the presalter cyclone to standpipe.

The solids collected by the presalter cyclone 500 can then flow into a seal-leg 900 as illustrated in FIG. 5 which shows the sub-loop for the cyclone system including the presalter cyclone, the seal-leg 900 and the crossover between the presalter cyclone 500 and the standpipe cyclone 600. The seal-leg comprises a downcomer 910 on one end connecting the cone of the Presalter cyclone to the horizontal leg portion 930, a vertical seal-leg riser section 920 and an inclined section 940 connecting the Seal-leg Riser and the gasifier standpipe 710. The length of the horizontal leg portion 930 can be about 2-10 times the inner diameter of the horizontal leg and depends on the characteristics and the solids circulation rates in the gasifier loop. The solids exit the horizontal leg through a short vertical leg (seal-leg Riser 920) and flow upwards; the height of the seal-leg riser will depend on the design of other parts in the seal-leg loop. In one embodiment of a transport gasifier, the height of the seal-leg riser 920 will be such that the solids level in the seal-leg downcomer 910 can be less than about 4-10 times the downcomer diameter. The pressure difference between the presalter cyclone inlet 510 and the standpipe cyclone inlet 590 can, in some embodiments, be nearly the same as the pressure difference between 510 and seal-leg exit 990 to the standpipe. The additional flow resistance in the seal-leg downcomer is reflected in the form of a solids level 915 in the downcomer. The higher the flow resistance, the higher is the solids level in the downcomer. The design of the seal-leg riser height can be used to adjust the flow resistance in the seal-leg and the solids level in the downcomer.

One objective of the seal-leg 900 can be to substantially ensure that the process gas flows from presalter cyclone upwards to standpipe cyclone inlet. This is achieved with a flowing column of solids in the seal-leg which prevents shortcircuit of process gas flow to Standpipe. Normally, the solids flow through the seal-leg is driven by the column of solids in the downcomer. In embodiments of this disclosure, the solids flow is driven by both pressure difference between the presalter cyclone and the standpipe as well as the column of solids in the downcomer. Due to this pressure difference and/or column of solids, higher solid fluxes can be realized through the seal-leg with minimum solids level in the downcomer and with minimum requirements for solids aeration. For circulating solid loops requiring high solid circulation rates such as in the case of gasification, embodiments of the disclosure lead to feasible compact seal-leg design for large scale commercial gasifiers. Furthermore, the solids level 915 in the downcomer can also be adjusted by the resistance of the flow path from 510 through the crossover bend 520 to the standpipe cyclone entrance 590. It may be desirable to increase the flow resistance in this part of the loop so that the solids level in the seal-leg downcomer can further be minimized to reduce the aeration rate and maximize the solids flux in the seal-leg.

To ensure high solids circulation rates in the gasifier loop, it may be desirable that the solids flow through the seal-leg smoothly. This can be accomplished by injecting a minimum amount of recycle gas into the seal-leg. The recycle gas characteristics can be nearly the same as the syngas produced in the gasifier, but it has been subjected to cooling, clean-up and recompression. In this embodiment, the aeration gas 980 to the seal-leg is divided into three branches. The aeration flow to the seal-leg downcomer 910 is generally downward inclined and the superficial velocity is between 0.03-0.1 ft/s in terms of the cross-section area of the Seal-leg downcomer.

Figure 6:
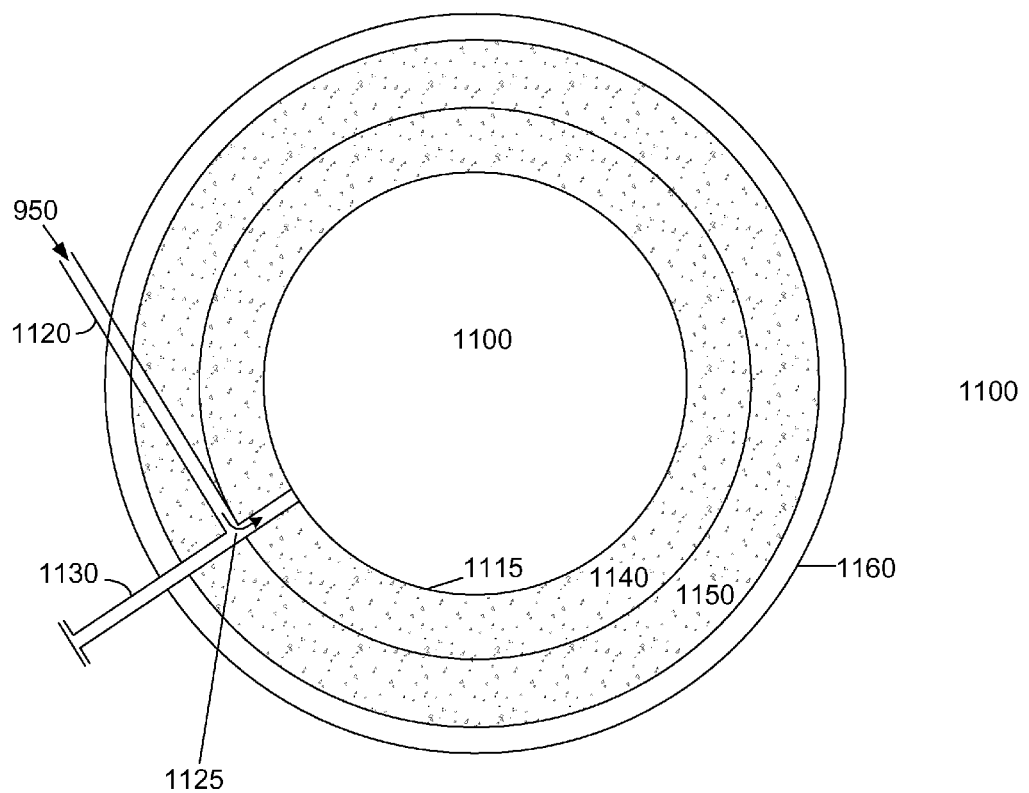
FIG. 6 is an illustration of a typical aeration nozzle design for gas streams that flow into the transport gasifier in upward direction.

Aeration gas 950 to the horizontal section 930 can be accomplished via nozzles 1100 having a design as illustrated in FIG. 6. This part of the transport gasifier comprises two legs and is termed as a dog-leg nozzle. The gas feed leg 1120 forms a substantially right angle with the drain/clean-up leg 1130. This type of aeration nozzle embodiment can be used for the refractory lined pipes where, if a prior art straight nozzle is used, may have a length to diameter (L/D) ratio generally more than 20. Such high L/D ratios lead to nozzle plugging which is detrimental to operations. As illustrated in FIG. 6, due to high pressure, high temperature and erosive environment typical of circulating fluidized bed gasifiers, the pipe generally has two layers of refractory. The inner layer 1140 is in contact with the circulating solids through the flow channel 1110 and comprises erosion-resistant refractory. The outer layer 1150 is in contact with the shell 1160 of the pipe and comprises insulation refractory to ensure that the shell metal temperature is below 300° F. The distance between the inner channel wall 1115 and the interconnection point between clean-up leg 1130 and gas feed leg 1120 can be in the range about 4-8 times the inner diameter of the nozzle. Because of the L/D ratio of this embodiment, even if the nozzle is filled with the solids, the aeration gas from gas feed leg 1120 can push the solids out of the nozzle and into the flow channel. This embodiment is successfully used in the transport gasifier nozzles where the aeration gas and gasification agent flow direction is upward.

Keeping the nozzle clean after a trip or shutdown can help ensure aeration gas flow to fluidize the solids and maintain high solids flow through the Seal-leg. The aeration rate to the horizontal leg of the seal-leg can be between about 0.03-0.1 ft/s based on the cross-sectional area of the horizontal leg and the gasifier operating pressure and temperature. Another branch of aeration gas 950 is fed to the seal-leg riser. Under normal circumstances, the aeration to the seal-leg riser is unnecessary. The only time the aeration gas may be required is when the solids flux is above about 450 lb/ft$^2$s. The normal capacity for the seal-leg presented in this invention of transport gasifier with both differential pressure and downcomer solids column driven solids flow is in the range of about 200-500 lb/ft$^2$s.

The gas with much reduced particle loading exits from the top of the presalter cyclone 500 and enters another cyclone located on top of the standpipe 700. A sketch of the transport gasifier's standpipe cyclone 600 is given in FIG. 7. In this non-limiting embodiment, the standpipe cyclone 600 has no cone and has the same diameter as the standpipe, simplifying the design and construction. It simply has a tangential inlet to the standpipe. As the standpipe cyclone 600 inlet receives a low concentration of fine particles in the gas stream, the cyclone has a vortex finder to ensure high capture efficiencies.

The gas with much reduced particle loading exits from the top of the presalter cyclone 500 and enters another cyclone located on top of the standpipe 700. A sketch of the transport gasifier's standpipe cyclone 600 is given in FIG. 7. In this non-limiting embodiment, the standpipe cyclone 600 has no cone and has the same diameter as the standpipe, simplifying the design and construction. It simply has a tangential inlet to the standpipe. As the standpipe cyclone 600 inlet receives a low concentration of fine particles in the gas stream, the cyclone has a vortex finder 620 to ensure high capture efficiencies.

Figure 7:
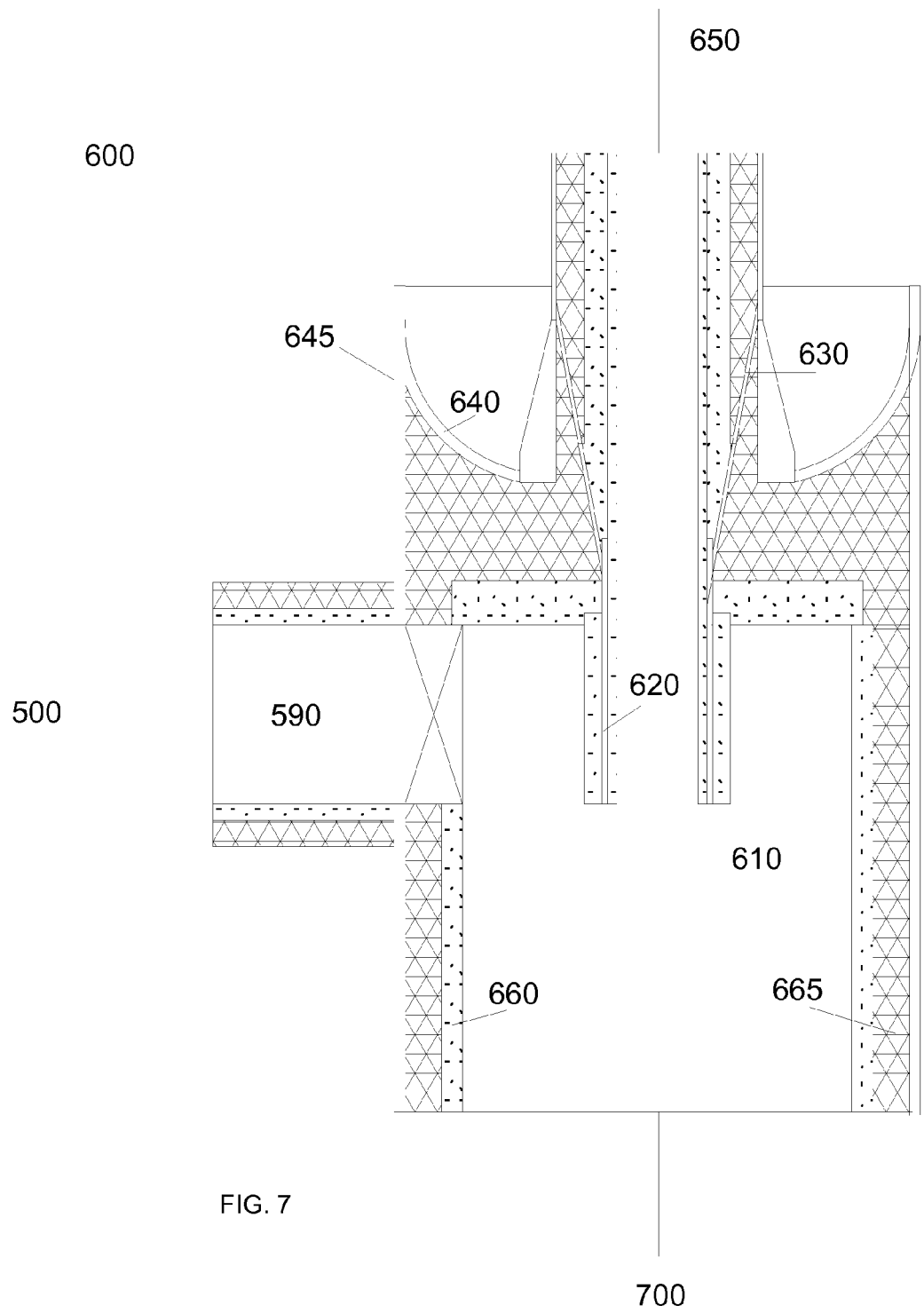
FIG. 7 is an illustration of standpipe cyclone design to withstand high pressure, high temperature and erosive environment of transport gasifier.

In the high pressure (up to about 1000 psig) and high temperature (up to about 2000° F.) environment of a transport gasifier, prior art designs to support a vortex finder is inadequate. As illustrated in FIG. 7, embodiments of the disclosure satisfactorily operate in the gasification environment. The vortex finder pipe 620 has a thin layer of refractory on both inside and outside to protect from erosion. The support for vortex finder 620 is embedded inside the insulating refractory which in-turn is attached to the shell with an expansion loop. The relatively low temperature at the support location and the expansion loop ensures that the support experiences minimum additional stress due to thermal expansion.

Figure 8:
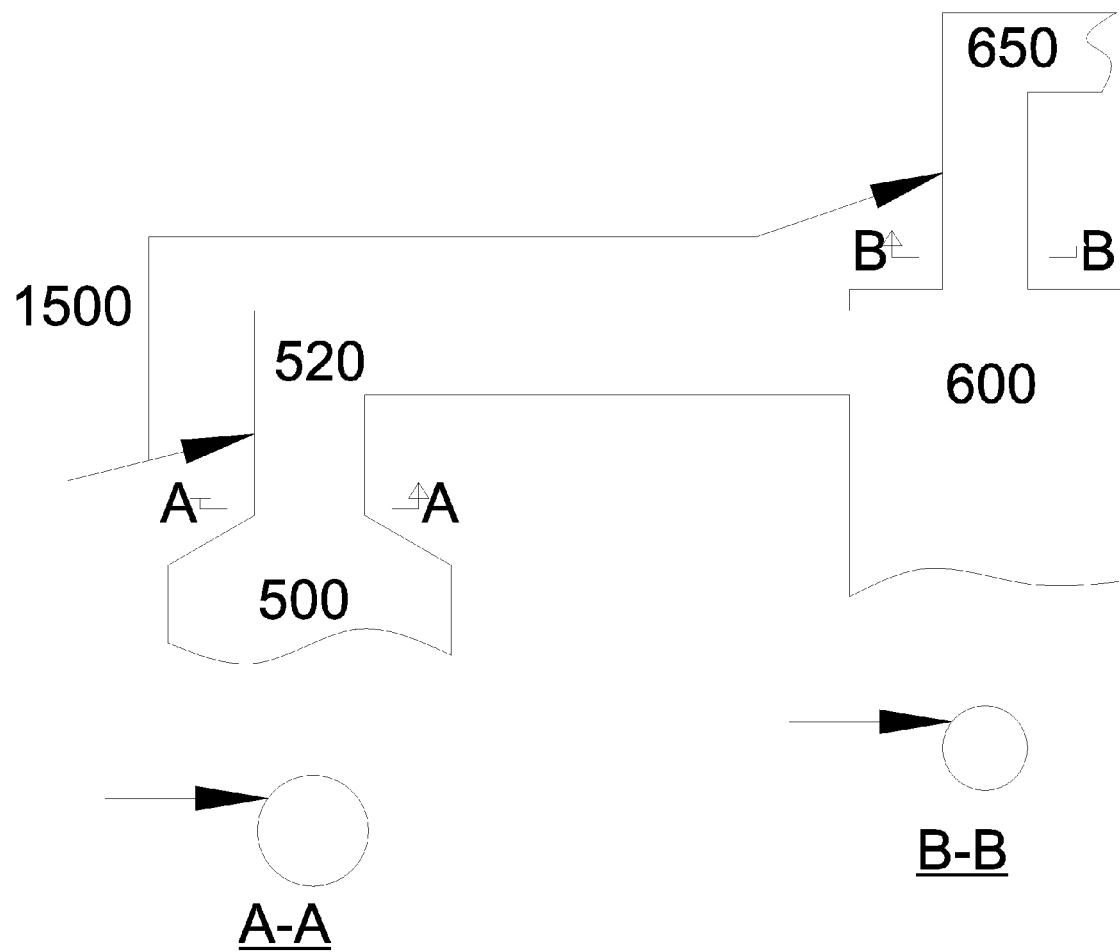
FIG. 8 is an illustration of oxidant injection at the cyclone exits to effectively modulate gasifier exit temperatures and slightly improve overall carbon conversion.

Some applications, such as power generation, and other applications may require precise control of the desired steam generation rate from cooling the hot syngas from gasifier and ensure the designed power output is maintained. However, there are many design uncertainties and aging of equipment that can cause the actual steam generation rates to differ from the designed rate. One of the desired features and also an effective feasible method is to modulate the gasifier exit temperature to achieve precise control of the steam generation rate. The extent to which the operating temperature of the entire gasifier loop can be changed as well as the rapidity of the change to achieve and maintain the desired gasifier exit temperature is limited. As shown in FIG. 8, the Transport gasifier exit temperature can easily be modulated by injecting a small fraction of the oxidant 1500 to the presalter cyclone 500 or the standpipe cyclone 600 exit, where the solids concentration is low and carbon concentration in the solids is relatively high. The fraction of oxidant 1500 injected is less than about 5% of total oxidant that enters the gasifier. In this embodiment of a transport gasifier, the oxidant injection also increases slightly the carbon conversion in the gasifier loop and reduces any aromatic hydrocarbon constituents in the syngas.

The propensity for solids circulation in the gasifier loop depends upon the hydrostatic head of the solids in the standpipe. The solids in the standpipe may need to be in a fluidized state. This is achieved both by gas entrained by the solids flowing downward in the standpipe and by fluidizing with the recycle gas through nozzles and distributors in the standpipe.

Figure 9:
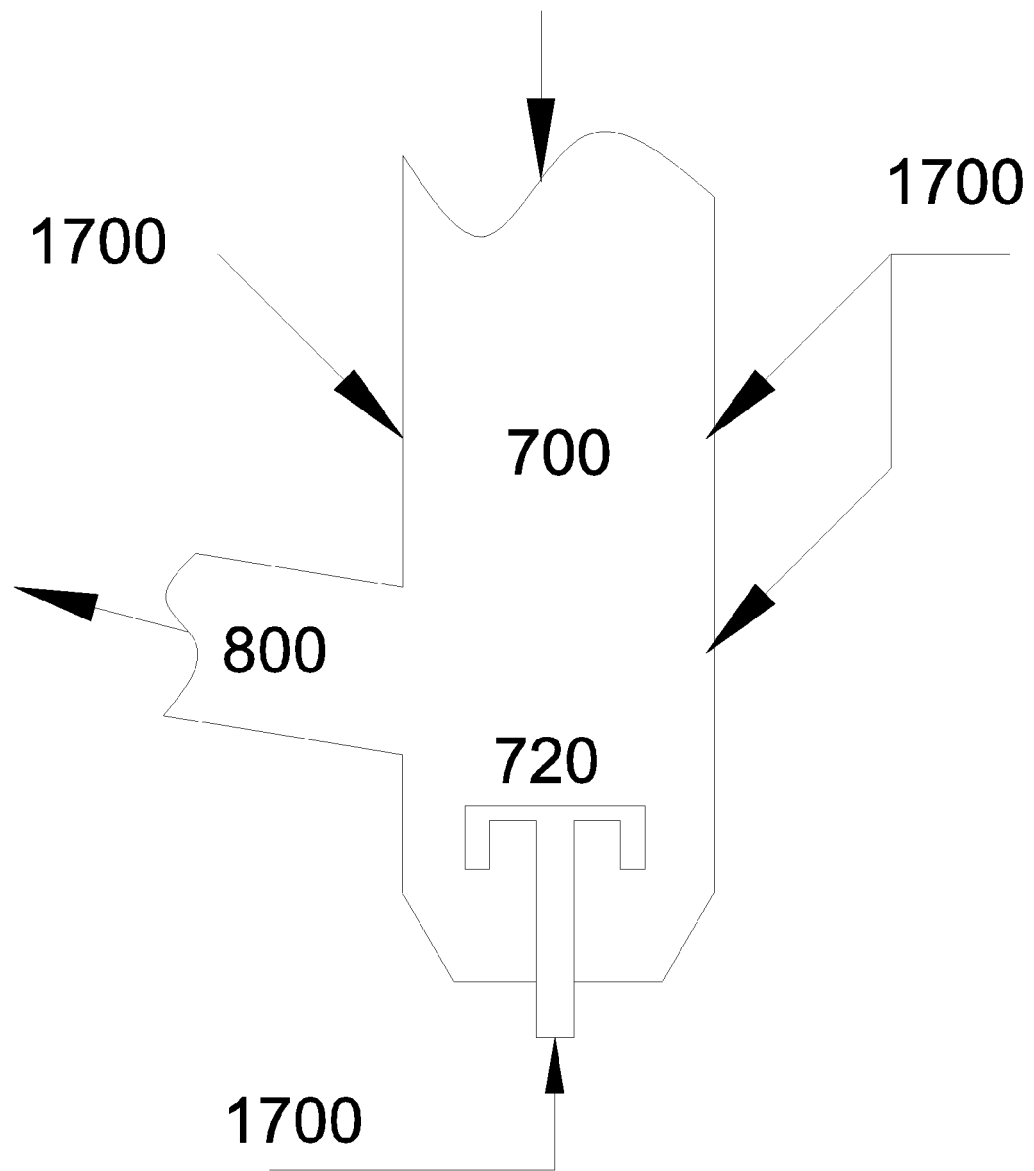
FIG. 9 is an illustration of aeration distributor for large diameter transport gasifier Standpipes.

In coal processing, the circulating solid is ash from the coal itself and mass mean diameters of the solids can range from about 75 to 100 microns depending on ash characteristics and with the cyclones functioning efficiency. The solids in this size range naturally entrain a certain amount of gas as it flows from presalter cyclone through seal-leg to standpipe. In addition, nozzles strategically located around the standpipe and aeration grid at the bottom of large diameter standpipes as shown in the embodiment in FIG. 9 provide sufficient fluidization and hydrostatic head to maintain high solids circulation rates around the gasifier loop. Aeration gas 1700 flows through the distribution grid 720 which is typically located about six to eighteen inches below the inlet of the non-mechanical valve 800. The solids level in the standpipe is maintained substantially constant by withdrawing coarser ash from the bottom of seal-leg riser and finer ash downstream of the transport gasifier.

Figure 10:
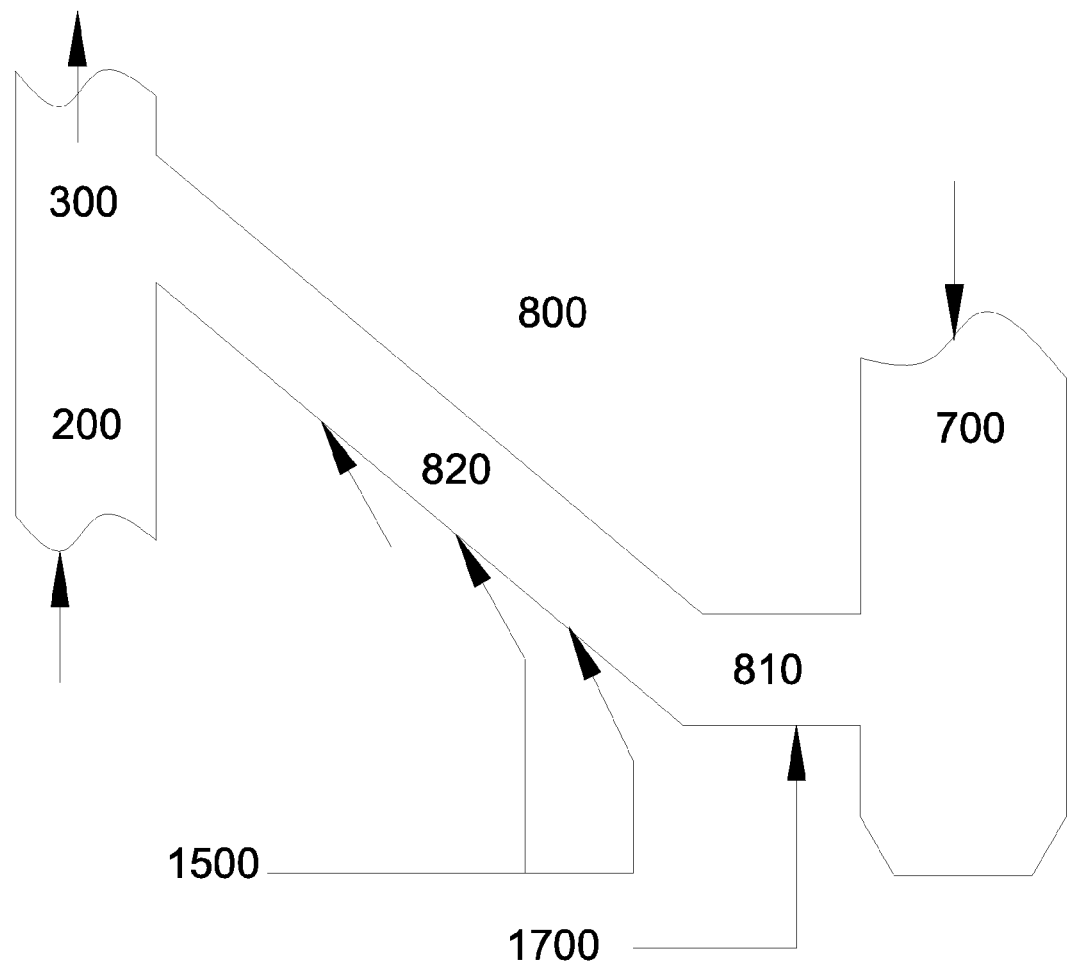
FIG. 10 is an illustration of L+J non-mechanical valve concept to decrease the overall height of the transport gasifier.

A non-mechanical valve 800 connects the standpipe to the mixing zone as illustrated in FIG. 10. One purpose of the non-mechanical valve is to reduce or prevent reverse flow of gases from the mixing zone into the standpipe. Typical non-mechanical valves that have been used in practice are termed as J-leg, L-leg and Y-leg. With both J-leg and Y-leg, the angle of inclination varies depending upon the characteristics of circulating bed of solids. If the coal throughput is fairly low, then the gasifier size is small and the centerline distance between the riser and standpipe is relatively small. Under these conditions, a J-leg is the preferred configuration. As the centerline distance between riser and standpipe increases, then the standpipe hydrostatic necessary to overcome the J-leg resistance also increases. This necessitates an increase in the height of the gasifier and a corresponding increase in the structure height and, thus, the capital costs. For transport gasifiers requiring larger throughputs, a new configuration as shown in FIG. 10 and termed as L+J leg, offers potential advantages. The short L-portion in the illustrated embodiment will serve as the non-mechanical valve reducing or preventing reverse flow of gases. The inclined J-portion will become part of the mixing zone/riser in the sense that oxidant 1500 and steam mixture can be introduced into the J-portion and char combustion reactions can be initiated. This way the hydrostatic head lost due to non-mechanical valve resistance is significantly reduced and thus making it feasible to reduce the height of the standpipe. Also, in this embodiment, an additional volume of the gasifier (J-portion of the L+J leg) where combustion and gasification reactions similar to that in mixing zone and riser becomes feasible. This reduces the height of the riser portion of the gasifier. Overall, the illustrated L+J embodiment can reduce the height of the gasifier which can be beneficial with large scale commercial gasifier design.

EXAMPLE

Described below is one non-limiting example of an engineering scale test unit of the transport gasifier illustrated in FIG. 1 that was built and extensively tested. None of the descriptions, ranges, or other information in this example should be considered to limit the scope of the disclosure above. The test unit gasifier has a nominal coal feed rate between 3,000 and 6,000 lbs/hr and uses both air and oxygen as the oxidant to react with char carbon in circulating solids to provide heat for the gasification reactions. Prior to tests with coal in the engineering scale unit, various embodiments of the transport gasifier were first tested in a large cold flow test unit with similar configuration. A number of different low rank coals were tested. The start-up solids inventory comprised coarse ash drained from the gasifier from a previous test run. The material in the solids stream at the test facility occasionally comprised sand with a mean particle size of 100-120 microns. Over a period of two days, the sand was gradually replaced with ash generated from feed coal. The particle size of the coal ash slightly depended on the coal properties and was nearly independent of the feed particle size in the range tested. Table I illustrates typical particle size of circulating solids for two different feeds. The median mass diameter is about 100 microns for the subbituminous coal tested at the transport gasifier and 80 microns for the lignite tested. As data was gathered by operating the gasifier at different test conditions, the solids flux in the riser varied in the range of 75-350 $lb/ft^2s$. The bulk density in the riser varied from 5 to 15 $lb/ft^3$, which is substantially higher than other circulating fluidized bed risers. Because of the high bulk density in the riser, the temperature across the entire riser was nearly uniform. The superficial gas velocities tested in the riser were in the range 20-35 ft/s at operating pressures that were in the range 160-250 psig.

TABLE I

Particle Size in Circulating Solids

| Mass Percent | Particle size (microns) Subbituminous Coal | Particle size (microns) Lignite |
|---|---|---|
| 10 | 49 | 35 |
| 20 | 61 | 46 |
| 30 | 71 | 57 |
| 40 | 83 | 69 |
| 50 | 97 | 84 |
| 60 | 117 | 104 |
| 70 | 150 | 135 |
| 80 | 235 | 197 |
| 90 | 392 | 347 |
| 95 | 489 | 461 |
| 100 | 640 | 639 |

The streams exiting the presalter and standpipe cyclones were isokinetically sampled. Results from these samples along with circulation rates were used to calculate individual cyclones and overall collection efficiencies. For tests with different fuels at various process conditions, the presalter cyclone efficiency is generally greater than 99.5%. Under most circumstances, the cyclone efficiency is between 99.6 to 99.7%. With the high solids loading and relatively larger particles at the presalter cyclone inlet, the erosion of the presalter cyclone wall had been a major concern. The cyclone wall showed little sign of erosion after more than 6300 hours of operation. This was not the case with a conventional cyclone which experienced serious erosion at a similar installation.

The overall collection efficiencies achieved during various tests was around 99.95%. The gas stream exiting the gasifier was generally in the range of 1600-1800° F. and was cooled in a syngas cooler to 600-1000° F. The cooled gas stream was filtered with candle filters to remove fine dust from the syngas. The typical mean particle size of fine dust (fly ash) was between 10 to 15 microns. Nearly all the char carbon loss from the gasifier is with the fly ash in the gas stream exiting the Standpipe cyclone. For lignite and subbituminous coals, the carbon conversion in the gasifier was generally greater than 98%. The solids collected by the presalter cyclone flow into the Seal-leg downcomer; the solids flux in the seal-leg downcomer was in the range of 100 to 470 $lb/ft^2s$ depending upon the solids circulation rates tested in the gasifier loop. The high solids flux rates were achieved as the solids were fully aerated and were near the minimum fluidization void fraction as well as due to the favorable pressure difference across the Seal-leg. The void fraction and solids velocity in the seal-leg downcomer and standpipe have been confirmed by different measurement methods including injection of solid particle tracers and CAT scans of flowing streams. The dog-leg type aeration nozzle in the Seal-leg and at other locations around the gasifier loop had been proven to be plug-free in spite of many gasifier shutdowns and trips. The various embodiments of transport gasifier presented in the Figures have been tested at the facility with various fuels at many different process test conditions. In addition to testing the transport gasifier invention for syngas generation with various coals, the concept was also successfully tested for nearly 5,000 hours as a pressurized circulating fluidized bed combustor termed as Transport combustor. Tests with two different applications, gasification and combustion, indicate that the embodiments developed in this invention can be used as transport reactor for a number of other applications requiring exposure of reactants to large surface area of solids and circulation rates.

What is claimed is:

1. A transport gasifier loop, comprising:
   a lower mixing zone coupled to a lower gas inlet section, the lower mixing zone configured to receive at least one gasification agent via the lower gas inlet section;
   an upper mixing zone coupled to the lower mixing zone, the upper mixing zone including an upper gas inlet section configured to receive the at least one gasification agent and a mixture of circulating solids, the upper mixing zone further coupled to a solids feeder;
   a riser coupled to the upper mixing zone, the riser configured to receive the mixture of circulating solids, the at least one gasification agent and gaseous products from the upper mixing zone, the riser further comprising a bend coupling the riser to an inclined crossover, wherein the gaseous products result from a reaction between the mixture of circulating solids and the at least one gasification agent;
   a presalter cyclone coupled to the inclined crossover, the presalter cyclone configured to separate solids particles from the gaseous products;
   a seal-leg coupled to a lower portion of the presalter cyclone, the seal-leg configured to receive solids from the presalter cyclone;
   a standpipe cyclone coupled to an output of the presalter cyclone, the standpipe cyclone configured to separate finer particles from the gaseous products; and
   a standpipe coupled to the seal-leg, the standpipe cyclone and the presalter cyclone, the standpipe configured to receive the solids particles from the presalter cyclone through the seal-leg, and the finer particles from the standpipe cyclone, the standpipe further configured to recycle the mixture of circulating solids to at least one of the lower mixing zone and the upper mixing zone.

2. The transport gasifier loop of claim 1, further comprising:
   an aeration distribution assembly coupled to the standpipe configured to facilitate recycling of the mixture of circulating solids from the standpipe to a non-mechanical valve, wherein the aeration distribution assembly is located about six to eighteen inches below an inlet to the non-mechanical valve.

3. The transport gasifier loop of claim 1, further comprising:
   a non-mechanical valve configured to couple the standpipe to the lower mixing zone and the upper mixing zone, the non-mechanical valve further configured to reduce reverse flow of gaseous material into the standpipe.

4. The transport gasifier loop of claim 3, wherein the non-mechanical valve further comprises:
   a short L-leg configured to provide a solids seal against a reverse flow of gases and a long J-leg.

5. The transport gasifier loop of claim 1, further comprising:
   an oxidant inlet coupled to an exit of at least one of the presalter cyclone and the standpipe cyclone, the oxidant inlet configured to receive an oxidant.

6. The transport gasifier loop of claim 1, wherein the lower gas inlet further comprises:
   a jetting throat coupled to a u-shaped refractory lined pipe that is further coupled to an inlet of the lower mixing zone.

7. The transport gasifier loop of claim 6, wherein a horizontal section of the u-shaped refractory lined pipe has a length of about four to eight times an inner diameter of the u-shaped refractory lined pipe.

8. The transport gasifier loop of claim 1, wherein the lower mixing zone has a diameter at least equal to at least one of the upper mixing zone and the riser.

9. The transport gasifier loop of claim 1, wherein the solids feeder further comprises:
   a plurality of nozzles configured to inject a carbonaceous material, the nozzles oriented at a downward angle of about fifteen to seventy-five degrees relative to a horizontal reference line.

10. The transport gasifier loop of claim 1, wherein the upper gas inlet section further comprises:
    a plurality of nozzles configured to inject the at least one gasification agent into the upper mixing zone, wherein a distribution of the at least one gasification agent produces a substantially even heat release.

11. The transport gasifier loop of claim 1, wherein the upper gas inlet section further comprises:
    a plurality of nozzles configured with a gas flow direction upwards into the transport gasifier loop, the nozzles having a downward nozzle connected to a gas source at a first end and to an upward flow nozzle into the transport gasifier loop at a second end forming a tee-junction; and
    wherein a distance between the tee-junction and a nozzle exit into the transport gasifier loop is about four to eight times an inner diameter of the upward flow nozzle.

12. The transport gasifier loop of claim 1, wherein the seal-leg further comprises:
    a seal-leg riser having a height of about twelve to thirty-six inches.

13. The transport gasifier loop of claim 1, wherein the seal-leg further comprises:
    a downcomer coupled to the output of the presalter cyclone and an input of the seal-leg, the downcomer configured to receive the solids from the presalter cyclone, the downcomer further configured to maintain a minimum solids level.

14. The transport gasifier loop of claim 1, wherein the standpipe cyclone further comprises a vortex finder supported by an expansion loop attached to an exterior shell of the standpipe.

* * * * *